June 23, 1936.　　A. W. CARPENTER　　2,045,119
MOTION PICTURE STEREOSCOPY
Filed Sept. 25, 1933

INVENTOR
Arthur W. Carpenter
BY W. E. Beatty
ATTORNEY

Patented June 23, 1936

2,045,119

UNITED STATES PATENT OFFICE 2,045,119

MOTION PICTURE STEREOSCOPY

Arthur W. Carpenter, New York, N. Y., assignor to United Research Corporation, Long Island City, N. Y., a corporation of Delaware Application September 25, 1933, Serial No. 690,829

2 Claims. (Cl. 88—16.6)

The invention relates to method and means for producing a motion picture stereogram.

In my co-pending application Serial No. 688,794 filed September 9, 1933 I have disclosed and claimed certain features important to the production of stereograms on film. I have also disclosed and claimed the adaptation of those features to the production of motion picture stereograms in my co-pending application Serial No. 690,830 filed September 25, 1933 wherein is disclosed an array of plane station mirrors forming images of the object from discrete viewpoints with means for sequentially impressing those images on a motion picture film. This sequential operation involves the motion at a rapid speed of certain optical apparatus.

The present invention while retaining the important features of the first mentioned application, is in the nature of an improvement on the second mentioned application in that I dispense with rapidly moving optical parts and provide a stationary optical arrangement for producing at a motion picture speed successive stereograms of a moving object.

For further details of the invention reference may be made in the drawing herein.

Figure 3:
Figure 4:
Figure 5:

Figs. 3, 4, and 5 are sectional views of different types of lineaters which may be employed.

Figure 1:
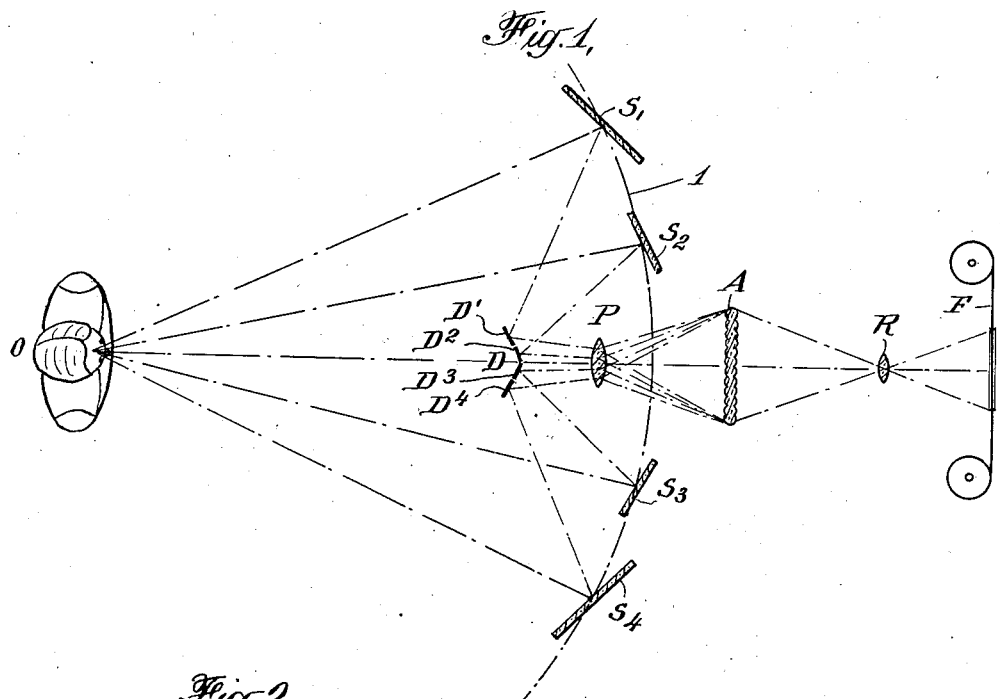
Fig. 1 is a schematic plane view of an arrangement for photographically producing motion picture stereogram.

Referring in detail to Fig. 1, the object O, of which a motion picture stereogram is to be photographically produced on the motion picture film F, is arranged in front of an arcuate array of plane station mirrors, S—1, S—2, S—3, S—4. The base line on which the mirrors, S—1, etc. are arranged may be the arc of a circle, or preferably the symmetric portion of an ellipse or other conic as disclosed and claimed in my application Seral No. 690,830 filed September 25, 1933. Each of the station mirrors S—1, etc. views the object O from a discrete viewpoint. The lines of sight from the station mirrors S—1, etc. are brought to a distributor or assembly mirror D, which reflects all of these lines of sight simultaneously to the objective lens P. At or near the image plane of lens P is lineater A which may take various forms such as the forms shown in Figs. 3, 4, and 5. The discrete angular views of object O as lineated by the lineater A are relayed to the film F by the relay lens R. The film F is of course contained in and operated by a standard motion picture camera and as all of the optical parts indicated in Fig. 1 are stationary, a motion picture stereogram of moving object O may readily be photographed on film F.

In case the film F is 35 m. m. film the lineater A preferably has a total number of lines such as to produce on film F about 420 lines, that is 420 groups of picture elements. For film of any other size, preferably the film should have between 300 and 600 lines per inch. Also each picture line element should be of the order of, or at least equal to five silver grains of the emulsion in width and furthermore the number of viewing stations (S—1, S—2, etc.) should be equal to the line pitch of lineater A divided by the width of an elemental line of light passing therethrough. In the case of an opaque screen this ratio comprises the ratio of line pitch to the opening in the screen. As there is no relative motion of the optical elements in Fig. 1 during the photographic process, the stereogram contains stripes as distingiushed from smears, as disclosed and claimed in my copending applications, Ser. No. 688,794 filed September 9, 1933 and Ser. No. 690,830 filed September 25, 1933.

Because of the recent advances in the design and construction of photographic objectives there have been for the past year available on the market objectives of extremely wide aperture with working apertures as high as F 1.4, or even greater. Such an objective, as indicated at P is anastigmatic and enjoys a high degree of zonal correction. It, therefore, becomes possible to create sufficiently high grade images using only a segment of the available lens. Such segmental images may be created by the use of segmentally apertured diaphragms as has been suggested in connection with certain color processes. They may equally well be created by one of the mechanisms which is the subject of this invention, namely, the interposition before the lens P of strips D1, D2, D3, D4 of plane parallel reflecting surfaces disposed at different angles to the axis of the object O and at different azimuths within the field of view of the lens P. The strips D1, D2, D3, D4 simultaneously reflect to lens P, the object images in the station mirrors S1, S2, S3, S4 respectively.

Figure 2:
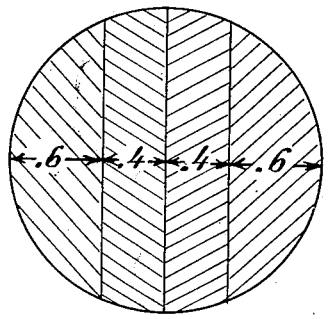
Fig. 2 is a sectional view of a segmental lens giving equal amounts of light in each segmented area.

If the horizontal angles subtended by these reflectors D1, D2, D3, D4 within the field of view of the lens P are properly proportioned, the active area of each can be made equal, one with another, and the amount of light which goes into the formation of each image will be equal in each case. Such a condition is indicated in Fig. 2, which is a diagram of the field of view of the lens P showing four distributor reflectors D1, D2, D3, D4 so proportioned as to yield equal areas of light reflecting surface.

With such a multiple deflector D placed before such an objective P the image formed will consist of a number of superimposed images; one being formed for each segment of the deflector. Each of these images will be a complete image of that portion of the field of view embraced by the individual reflecting surface and if the deflector D is reinforced as shown by a battery of properly oriented station mirrors S1, S2, S3, S4 then these several superimposed images will all be images of the object identical save as respects angle of view. Since, however, the line of sight directed from the objective P to each of these deflecting surfaces D1, D2, D3, D4 differs in azimuth from its fellows the several resulting images will each be formed by bundles or pencils of rays, each having a different inherent azimuth or inclination to the image surface than that of the bundles of rays forming the other images.

This inherent difference in orientation of the light forming the different images may be so analyzed by a lineater such as transparent ribbed screen having its refracting ribs arranged parallel to the long axis of the deflection mirrors D1, D2, D3, D4 as to form the desired types of interlined stereopanoramagrams. Ribbed screens which are suitable to resolve images of this sort are indicated by the sectional diagrams in Figs. 3, 4, and 5. If a ribbed analyzer such as A is placed at or near the image plane then the light forming one of the superimposed images will fall upon the screen with a predetermined inclination to the surface of the analyzer and will be broken up by the ribs of the analyzer and imaged by them as narrow stripes displaced to the opposite side of the optical axis of each rib by an amount determined by the inclination of the incident light. Since the inclination of the incident light is inherently different for each image, due to the differing azimuths on deflector mirrors, D1, D2, D3, D4 it follows that the narrow stripes of images formed by the ribs of the analyzer A will be arranged side by side across the axis of the individual ribs and separated by an amount predetermined by the deflector azimuths. Once the superimposed images are analyzed into interlined banded images in this fashion they may be relayed on to the photographic surface by a relay lens, as at "R", and the resulting record will be that of the desired interlined stereopanoramagrams. They might, of course be laid down directly on the photosensitive surface by placing the analyzer substantially in contact with the emulsion of film F but the relay form shown is preferred.

It is to be noted that this apparatus permits simultaneous recording of all of the station views and that there occur, therefore, no defects of image similarity due to motion in the object or other defects incident to the employment of moving parts.

The stereogram prepared as above described, may be viewed by projecting an image thereof onto a screen in register with a line screen in any well known manner. The stereogram of this invention may also be viewed in any other suitable manner.

Having thus described the invention, what is claimed as new and desired to be secured by Letters Patent, is:

1. A motion picture stereoscopic photographing arrangement comprising the combination of an arcuate array of a plurality of pairs of plane reflecting surfaces each adapted to form a reflected image of an object from a discrete viewpoint; said surfaces being symmetrically disposed about a base line symmetrical with regard to said base line and a lineater disposed in front of a light sensitive surface, said lineater receiving light rays reflected from said plane reflecting surfaces, means symmetrical with respect to said base line for simultaneously diverting rays from a plurality of said plane reflecting surfaces to said lineater and to said light sensitive surface, and a relay lens between said lineater and said light sensitive surface.

2. Arrangement for forming a motion picture interlined parallax panoramagram of an object comprising more than two pairs of reflecting surfaces symmetrically arranged about a base line, one member of each of said pairs comprising a separate plane station mirror, each of said plane station mirrors adapted to form a reflected image of said object from a discrete viewpoint, the other member of each of said pairs receiving the image in its associated plane station mirror and simultaneously diverting the same along optical paths, with a lineater for a light sensitive surface in said paths, and a relay lens between said lineater and the light sensitive surface said light sensitive surface being responsive to light of the same character for different angular viewpoints of said object.

ARTHUR W. CARPENTER.